Aug. 25, 1959 R. W. HAMILTON 2,901,078
MULTIPLE COIN PARKING METER
Filed Feb. 16, 1956 10 Sheets-Sheet 1

R. W. HAMILTON
*INVENTOR.*

BY
ATTORNEY

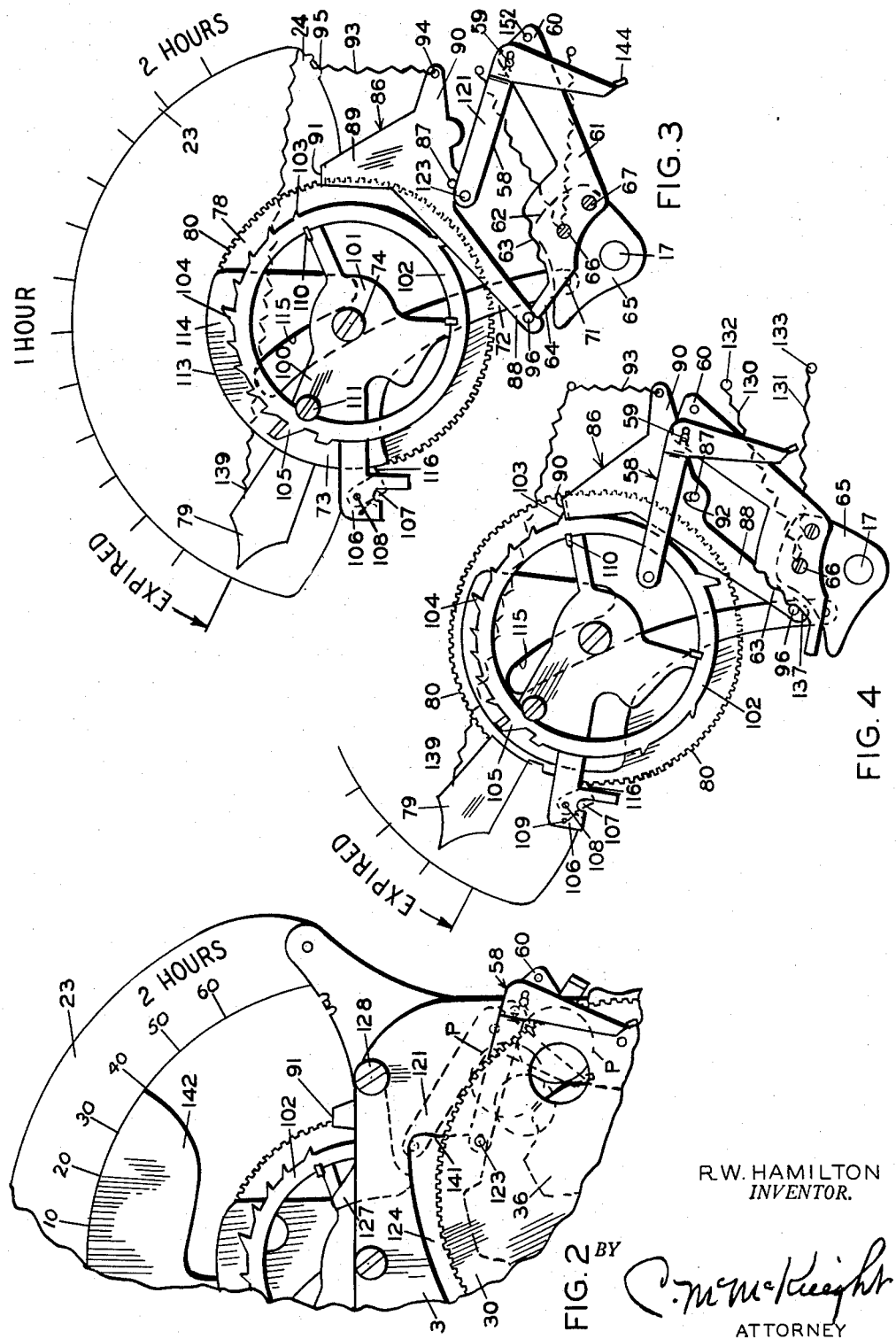

Aug. 25, 1959
R. W. HAMILTON
2,901,078
MULTIPLE COIN PARKING METER
Filed Feb. 16, 1956
10 Sheets-Sheet 3
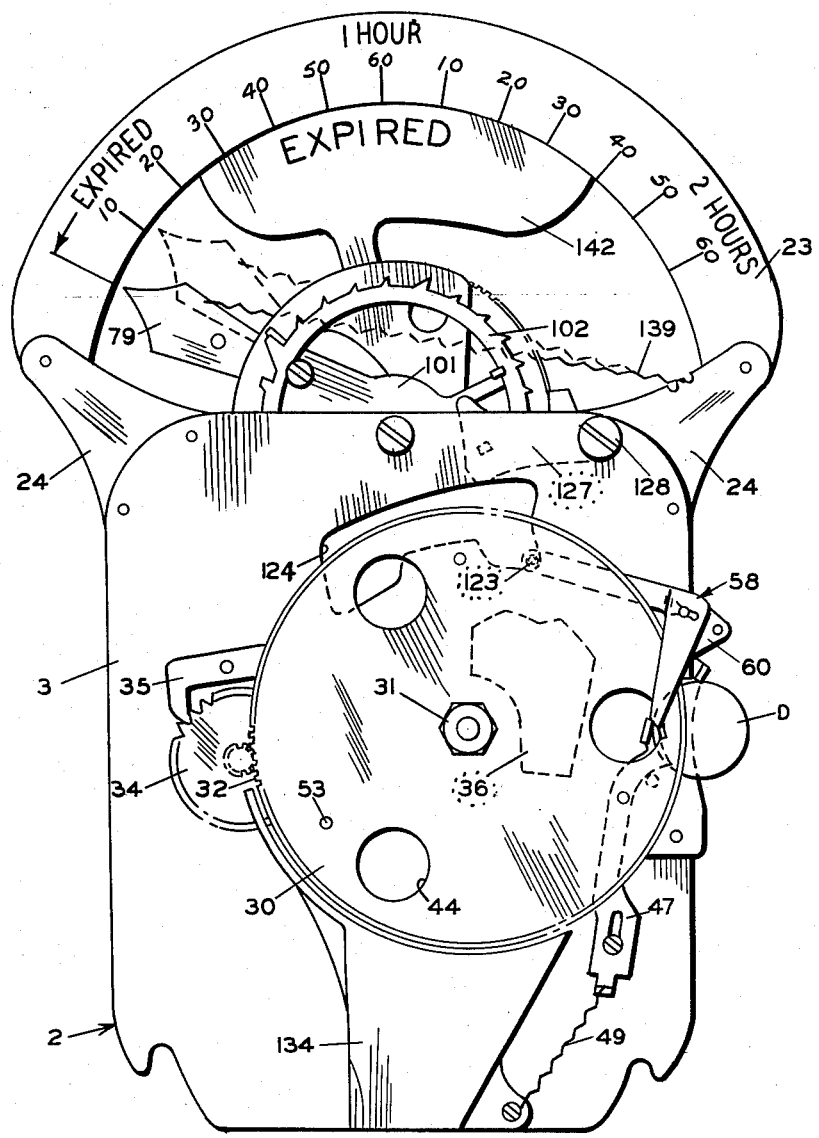
FIG. 5
R.W. HAMILTON
*INVENTOR.*
BY 
ATTORNEY

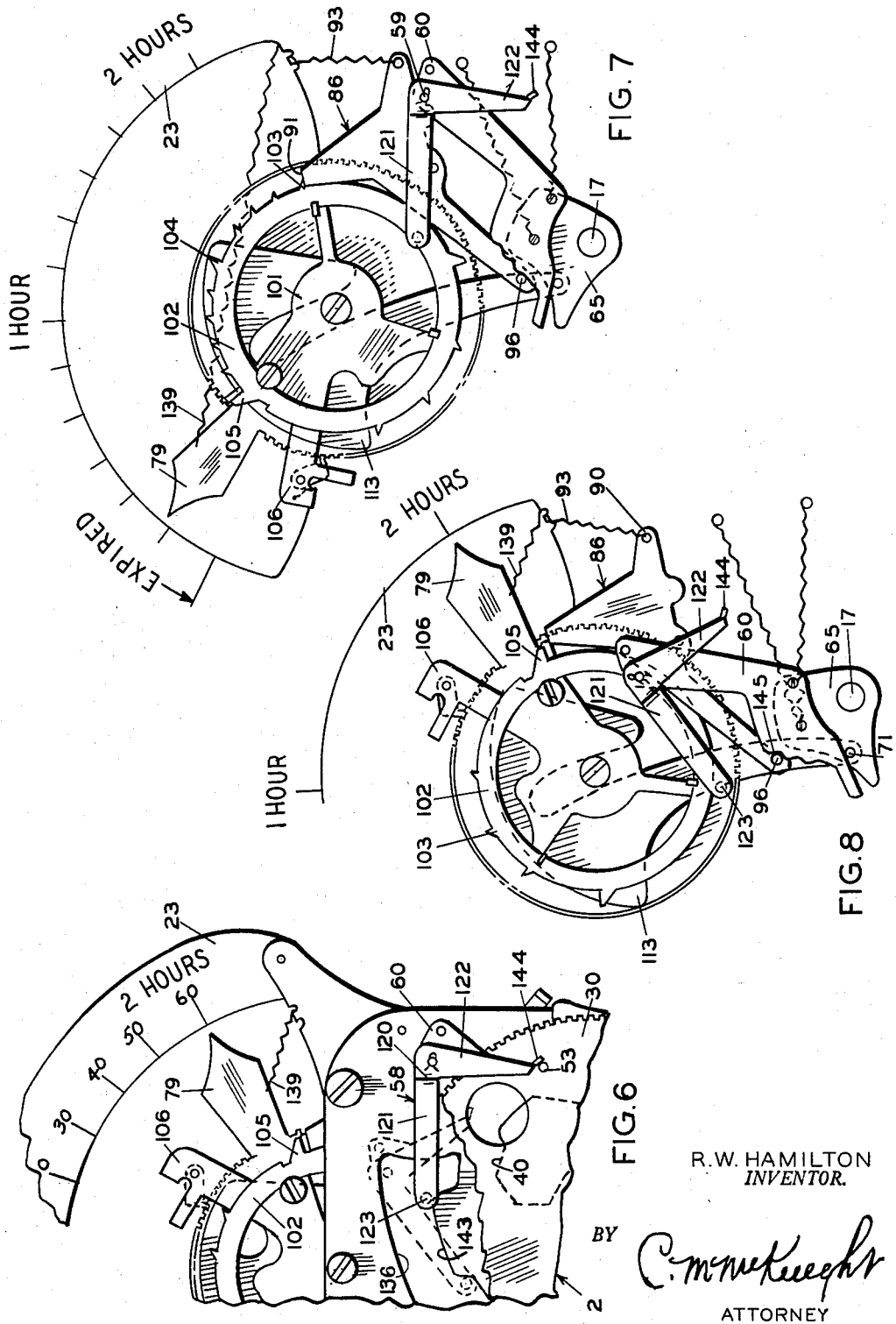

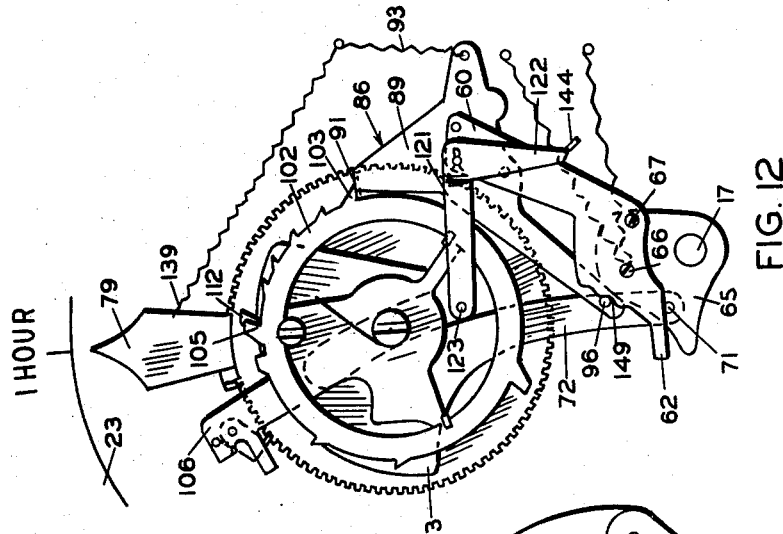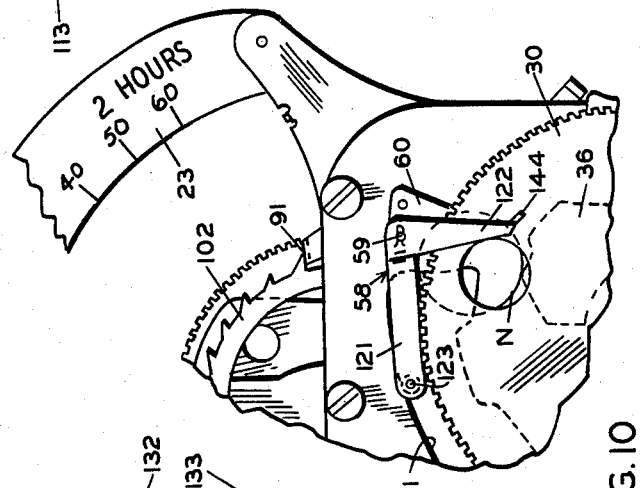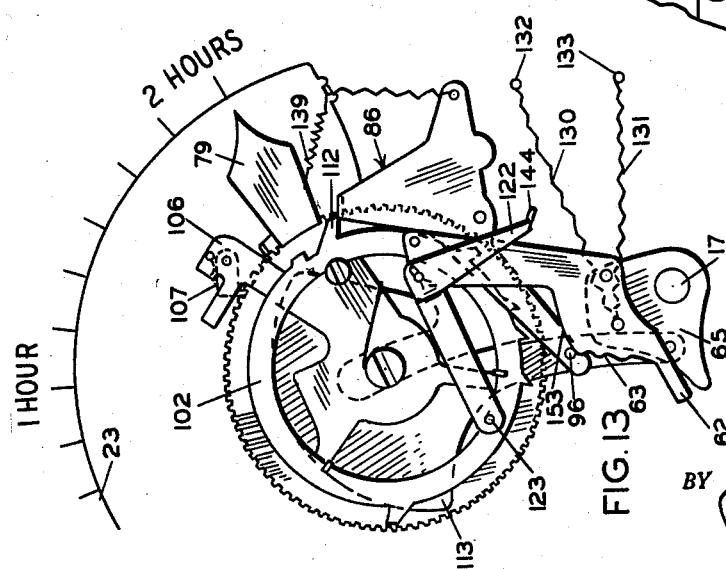

Aug. 25, 1959 R. W. HAMILTON 2,901,078
MULTIPLE COIN PARKING METER
Filed Feb. 16, 1956 10 Sheets—Sheet 8

R.W. HAMILTON
*INVENTOR.*

BY
ATTORNEY

Aug. 25, 1959

R. W. HAMILTON 2,901,078

MULTIPLE COIN PARKING METER

Filed Feb. 16, 1956

R. W. HAMILTON
*INVENTOR.*

BY

ATTORNEY

Aug. 25, 1959  R. W. HAMILTON  2,901,078
MULTIPLE COIN PARKING METER
Filed Feb. 16, 1956  10 Sheets-Sheet 10

R. W. HAMILTON
*INVENTOR.*

BY C. M. McKnight
ATTORNEY

United States Patent Office 2,901,078
Patented Aug. 25, 1959

2,901,078

MULTIPLE COIN PARKING METER

Robert W. Hamilton, Oklahoma City, Okla., assignor to Magee-Hale Park-O-Meter Company, Oklahoma City, Okla., a corporation of Delaware Application February 16, 1956, Serial No. 565,855

10 Claims. (Cl. 194—72)

This invention relates to an automatic parking meter for indicating parking time on city streets, parking lots, or parking spaces and the like, and more particularly, but not by way of limitation, to an automatic parking meter which is operable by one or more denominations of coins and which will operate by multiple coins of each of a selected or variable denomination, in a manner to accumulate the time by a subsequent insertion of a coin during the operation of a meter that already shows time indicated thereon.

This application is an improvement over the prior United States of America patents to G. A. Hale, No. 2,532,906 issued December 5, 1950, and No. 2,625,250 issued January 13, 1953, respectively, as well as an improvement of applicant's co-pending application, Serial No. 345,571 filed March 30, 1953, and entitled "Automatic Parking Meter."

A parking meter operates in all weather conditions, and a great number of present day parking meters depend on gravity to drop the coin through a coin chute in order to operate at least certain phases of the meter operation. It becomes apparent that any gravity operation is subject to weather conditions, such as infiltrated moisture, freezing rain, dust, and the like having a detrimental effect on the operation of the meter. Furthermore, there are many present day meters utilizing a multiple coin operation wherein the coins may be of variable denominations, such as a penny and nickel, such as the prior patents to Hale above mentioned.

The present invention broadly is concerned with an automatic parking meter which starts its operation through a coin tripping a latch when inserted into the machine by the operator's finger. The machine may be selectively operated by a plurality of variable sized coins or coins of numerous denominations, as well as multiple coins of each of the sizes or denominations. The indicating time is set by a predetermined stop mechanism operating with a coin setting lever wherein the time indicator is released from a driving connection with a clock train to be allowed to return to a starting or time indicating position under the energy of a spring. The time indicating position is regulated by the stop mechanism in accordance with the size or denomination of the coin or coins. The time indicator after being set is moved in one direction with the clock-driven connection gear train to show utilization of the selected time.

It is an important object of this invention to provide an automatic parking meter which is operable on a plurality of coins of variable sizes, or denominations, as well as multiple coins of each size or denomination.

It is a further object of this invention to provide an automatic parking meter which can be infinitely adjusted for operation with various combinations of coins of variable sizes or denomination, and a multiple of such variable coins to provide any desired length of parking time complementary to the value of the coins or the multiple coins utilized.

A further object of this invention is to provide a fully automatic parking meter which is operable on at least four coins of variable sizes and denominations.

Still another object of this invention is to provide a parking meter which may be adjustable to provide for any desired length of parking time through insertion of a multiple of variable sized coins or coins of variable denominations, although there may not be a sequential relationship between the value of the coin and its physical size in comparison to other coins in the operating series.

And still another object of this invention is to provide an automatic parking meter which is operable on two or more coins or multiples of coins of variable sizes or denominations giving full indicating time in complement to the value of the coin upon insertion.

A further object of this invention is to provide a parking mechanism whereby the coin is inserted into the meter by the operator's finger to cause actuation of a power driven coin propelling element which picks up the coin and moves a predetermined distance dependent upon the size of the coin in order to operate an indicator stop unit for re-setting the time indicator complementary to the value of the coin inserted.

An additional object of this invention is to provide an automatic parking meter wherein insertion of a coin under the force of the operator's finger moves a coin trip lever which in turn only serves to release a power driven coin propelling element of the mechanism thereby eliminating the use of the weight of the coin for tripping the mechanism into operation thereby producing a tripping action which is more positive, simple and durable.

An additional object of this invention is to provide an automatic parking meter which has a power driven element released through insertion of the coin into the mechanism which operates to re-set a time indicator in complement to the value of the coin and will also display the coin to decrease the possibility of utilizing slugs in the mechanism.

And still another object of this invention is to provide an automatic parking mechanism wherein the mechanism for re-setting the time indicator is released to operate, and not forcibly moved through a fixed distance.

And still another object of this invention is to provide an automatic parking mechanism which allows immediate re-setting of a time indicator upon the successive insertion of multiple coins of like or different denominations and which is adjustable to provide for numerous combinations of each denomination of coin.

And still another object of this invention is to provide an automatic parking meter having a time indicator re-setting mechanism for moving the time indicator from one position to another relative to the time scale, and which will cumulate the time upon each re-setting of the time indicator irrespective of the starting position of the indicator.

And a further object of this invention is to provide a selective coin automatic parking meter adapted for cumulating time in the time indicating mechanism in accordance with the size or denomination of coin utilized, and wherein the meter is automatic and more durable in its operation, simple in construction, and facilitates the maintenance and any adjustment thereof.

And still another object of this invention is to provide an automatic parking meter in which there is a memory function in the operation of the indexing apparatus permitting insertion of a first coin without any substantial time registration followed by a second coin to provide the required time registration.

And still another object of this invention is to provide an automatic parking meter which is operable to provide variable increments of time registration for a plurality of coins of various size and particularly to provide full registration of time for coins of smaller diameter but greater value contemporaneous with coins of larger diameter but of lesser as well as larger value.

And still another object of this invention is to provide an automatic parking meter that will accept more than two coins of variable size and variable denominations to provide variable time registration therefor.

And still another object of this invention is to provide an automatic parking meter accepting more than two coins of variable size through a single coin slot to provide time registration for the meter.

And still another object of this invention is to provide an automatic parking meter accepting more than two coins of variable size and denomination through a single coin slot for multiple and variable time registrations thereof.

Other objects and advantages of the invention will be evident from the following detailed description, read in conjunction with the accompanying drawings, which illustrate my invention.

In the drawings:

Figure 2 is a similar view to Fig. 1 with certain parts broken away and depicting another operating position for the meter.

Figure 3 is a diagrammatic detail view in front elevation showing the indicator re-set mechanism with certain parts omitted for clarity and also showing the stop mechanism for the cumulative indexing.

Figure 4 is a similar view to Fig. 3 showing another operating position therefor.

Figure 5 is a view similar to Fig. 1 showing initial rest position of the meter for another size coin, such as a United States ten cent coin.

Figure 6 is a similar view to Fig. 5 with certain parts omitted showing another operating position thereof.

Figure 7 is a view similar to Fig. 3 depicting another position of the indicator re-set mechanism for the ten cent coin.

Figure 8 is a view similar to Fig. 4 showing the re-set mechanism and cumulative indexing for a dime coin operation.

Figure 10 is a similar view to Fig. 2 showing a different operating position for the nickel coin insertion.

Figure 12 is a view similar to Fig. 3 showing the initial operation for the five cent coin.

Figure 13 is a similar view to Fig. 3 showing the operation for a twenty-five cent coin.

Figure 1:
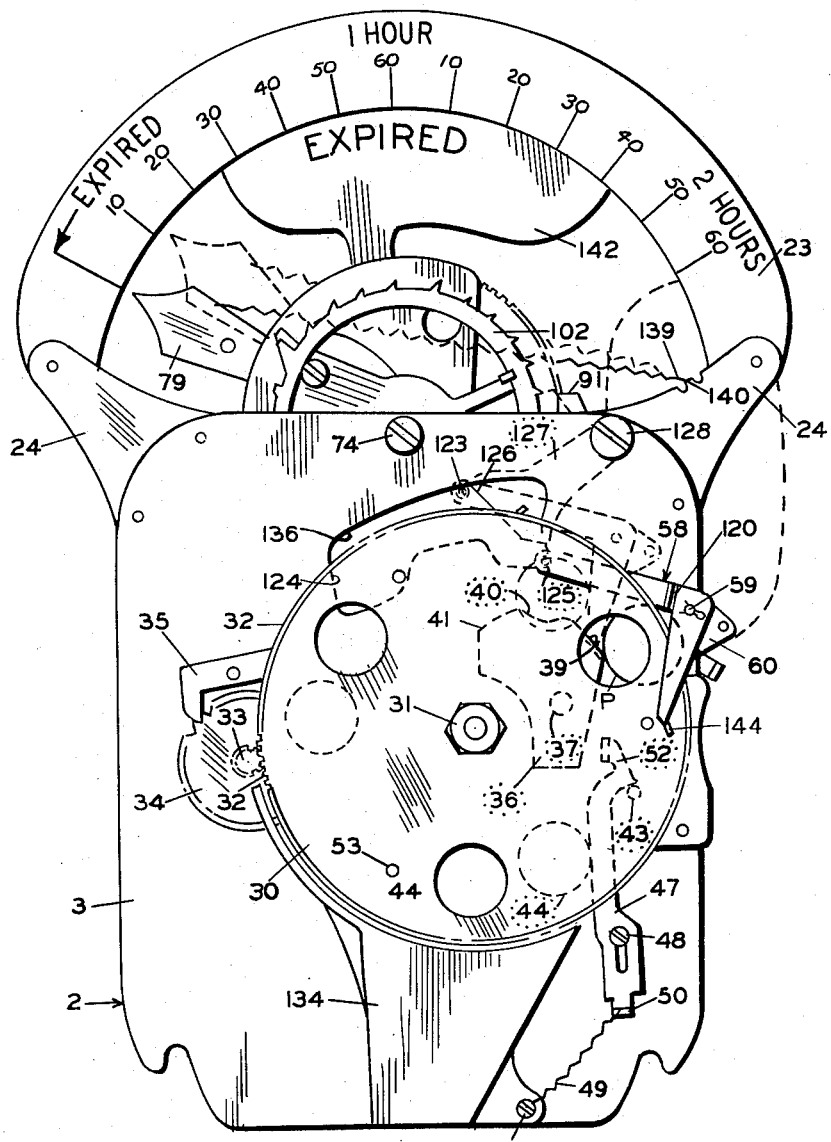
Figure 1 is a diagrammatic front elevational view of the parking meter mechanism with certain parts broken away and showing some of the elements in normal position before the insertion of a United States one cent coin.
Figure 14:
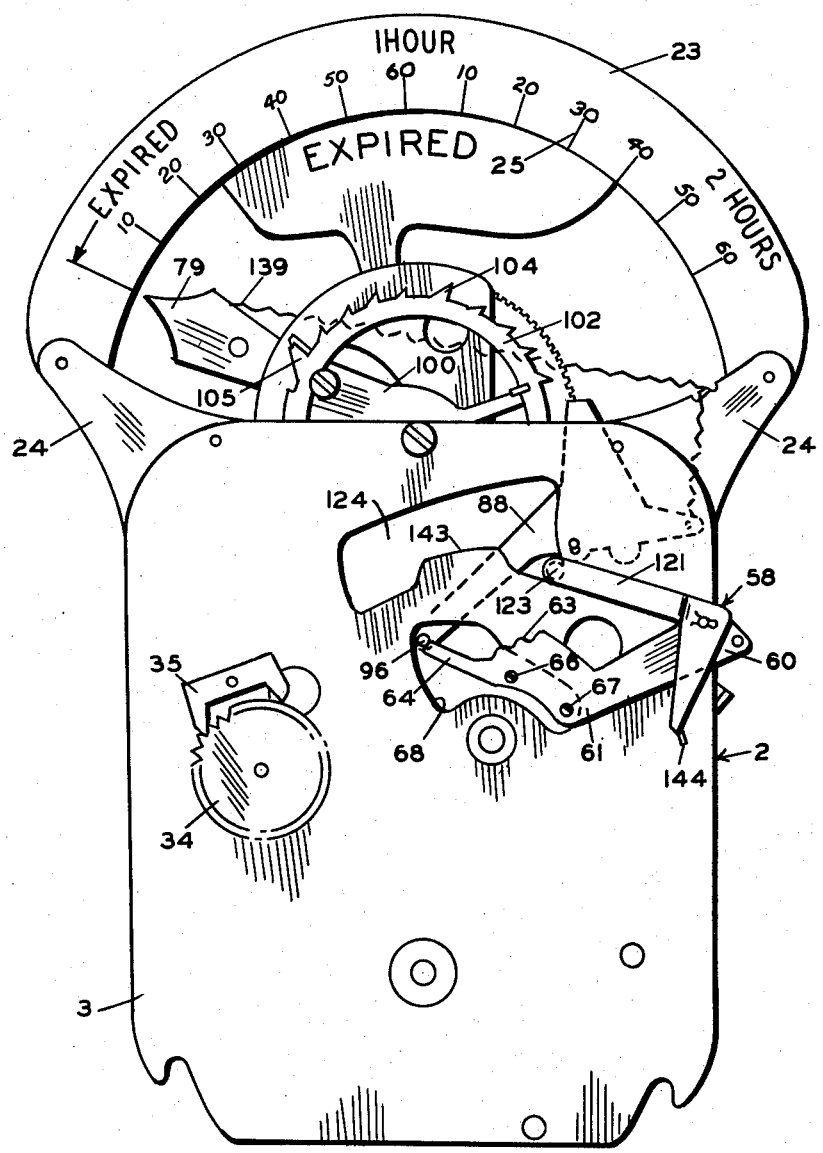
Figure 14 is a view similar to Fig. 1, but with the rotator blade and other parts omitted for clarity, depicting the indicator re-set mechanism at starting position.
Figures 15, 16:
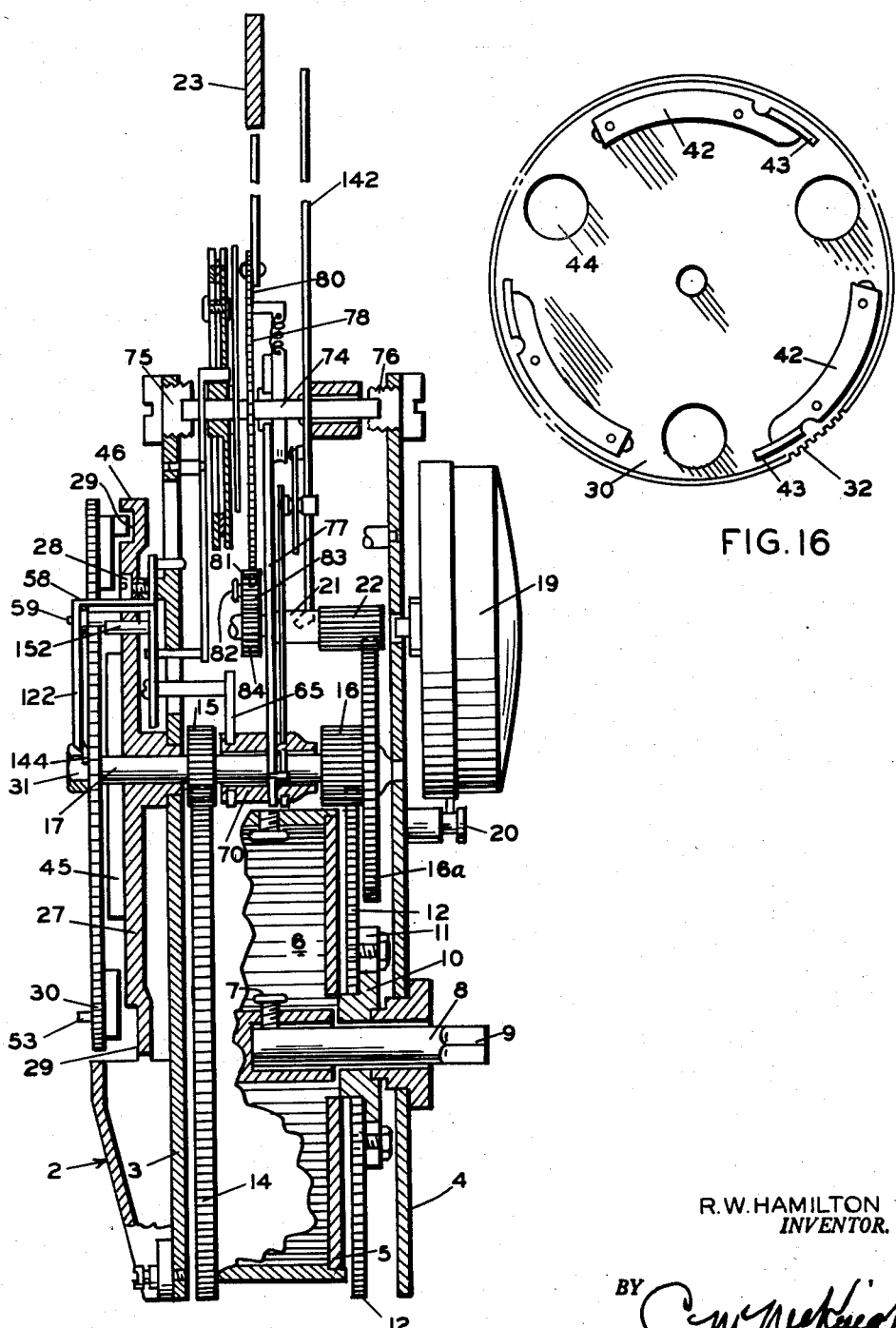
Figure 15 is a side elevational view mainly in section taken from the right of Fig. 1 and with certain parts omitted for clarity.
Figure 16 is an elevational view of the rear face of the rotator plate.

Referring to the drawings in detail, and more particularly to Figs. 1 and 14 and 15, reference character 2 designates a parking meter mechanism generally adapted to be encased as a unit in a suitable housing (not shown) which forms no part of the present invention. The mechanism comprises a pair of spaced plates wherein the front plate 3 (Fig. 15) in conjunction with the rear plate 4 provide an outer framework for the parking meter unit. A main spring housing 5 is disposed in any suitable manner between the plates 3 and 4 and includes a main spring 6 suitably anchored at one end by a set screw 7 to a shaft 8. The shaft 8 is disposed in any suitable manner at opposite ends (not shown) to the plates 3 and 4 respectively. The rear end of the shaft 8 extends outwardly from the plate 4 and is provided with a square end 9 suitable for receiving any suitable winding key to cause rotation of the shaft and wind the main spring 6 when desired. The shaft 8 is free to rotate in its mounting by any winding of the spring, and is provided with a ratchet 10 fixed to the shaft 8 in any suitable manner at a position adjacent one side wall of the barrel housing 5. The ratchet 10 cooperates with a set of pawls 11, only one of which is shown, secured to a large gear 12 by suitable studs 13.

The circular outer edge of the front plate of the housing 5 is provided with a plurality of gear teeth 14 adapted to engage with a connecting gear member 15 forming part of a gear train for a purpose to be hereinafter set forth. The gear 12 is rotatably carried by the ratchet member 10, as will be noted in Fig. 15, and is slightly spaced from the housing 5. The gear 12 is in engagement with a freely rotatable pinion and gear 16 mounted on a main drive shaft 17 disposed between the plates 3 and 4. The shaft 17 is normally rotatable between the plates 3 and 4 and carries the fixed gear 15 therewith. The pinion 16 is freely mounted on the shaft 17. As will be noted in Fig. 15, one end of the spring 6 is anchored to the shaft 8 through the set screw 7, while the opposite end is anchored to the barrel housing 5 through a set screw 18 as shown. It will be apparent that the spring barrel 5 drives pinion 15 and shaft 17 through the large gear 14, whereas the compound gear 16 is driven by the large gear 12 and is in turn driven by the other end of the spring 6 through set screw 7, shaft 8 and ratchet 10.

A suitable timer or clock works 19 is secured by locking studs 20 to the rear plate 4. A clock shaft 21 extends from the clock mechanism 19 and is disposed between the plates 3 and 4. The shaft 21 as shown in Fig. 15 is broken for purposes of clarity. The shaft 21 is provided with a pinion 22 adapted to mesh with the compound gear 16, thereby providing a driving connection for the clock works 19 from the main spring 6.

Referring to Fig. 1, a dial member 23 of substantially arcuate configuration is disposed above the plates 3 and 4 by opposite extension flanges 24 adapted to be secured in any suitable manner (not shown) at opposite sides of each of the plates 3 and 4. Both front and rear faces of the dial 23 are scaled as at 25 to show the total time registration required. The dial may vary from a few minutes to several hours, depending upon the particular requirements. In the present instance, the dial has been shown as in Figs. 3 and 7 as a two hour scale divided into approximately ten minute intervals. The dial 19 is provided with a cut-away or apertured portion 26 for convenience and lightness.

Referring to Fig. 15, the main shaft 17 extends through the front plate 3 and on its outer end is adapted to receive a circular coin pan 27 fixed to the front plate 3 in any suitable manner, preferably by stud members 28. The coin pan is provided with a circular recessed portion 29 for a purpose as will be hereinafter set forth. On the extreme outer end of the shaft 17 there is provided a coin propelling or rotator plate 30 disposed in horizontal spaced relation to the coin pan 27. It is apparent that the pan 27 is also slightly spaced from the front plate 3, and the coin rotator plate may be secured to the shaft 17 by a suitable nut 31. The gear 14 is rotatable and meshes with the pinion gear 15 mounted on the shaft 17 to provide a driving connection for the coin rotator plate 30 from the energy of the main spring 6. The outer circumferential periphery of the rotator plate is provided with a plurality of gear teeth 32 (Fig. 1) adapted to mesh with a gear 33 of a speed limiting device, comprising a star wheel type unit 34 and a pivotal detent 35 much in the same manner as in applicant's co-pending application hereinbefore mentioned. From the foregoing, it will be apparent that the main spring 6 provides a source of energy for both the clock works 19 and the coin rotating plate 30, the function of which will be hereinafter set forth.

The front face of the coin pan 27 is provided with a raised boss having a cut-away portion (neither of which is shown) adjacent which is disposed a cam member 36 (Figs. 1 and 2). The cam is of an oddly shaped configuration as shown, and is fixed to the coin pan 27 by a suitable screw 37. The configuration of the cam is such that it is provided with a substantially vertical straight face 38 at one side communicating with a slightly inclined or angled face 39 in turn communicating with a top recessed portion 40 communicating with a second inclined portion 41 thereof for a purpose as will be hereinafter set forth. The back face of the coin rotator plate 30 is preferably provided with a plurality (preferably three, but not limited thereto) of circumferentially spaced coin catch members 42 (Fig. 16) each having a hook or pin member 43 on one end thereof. The outer end of pin 43 is preferably curved or circular in shape as shown in Fig. 1, but not limited to such configuration, thereby permitting facility of operation with a coin as will be hereinafter set forth. A plurality of spaced apertures 44 acting as coin display windows are provided on the rotator plate 30. A circular slot portion 45 is provided between the rotator plate 30 and the coin pan 27, acting as a coin slot for receiving the coins as will be hereinafter set forth.

The coin pan 27 is provided with a circumferential rim or outwardly extending flange 46 (Fig. 15) in order to assist in maintaining the coins moving in a circular path between the plate 30 and the pan 27. The rim 46 extends substantially through a greater portion of the circumference of the pan 27. However, certain circumferential portions thereof are omitted in proximity of the trip lever 47 and the coin slot 45 to provide an aperture for reception of the coins. A coin trip lever 47 shown partially in dotted lines in Fig. 1 is pivotally mounted on the front plate 3 by a pin 48, having the return action provided through a spring 49 anchored at one end 50 to the lever 47 and at opposite ends to a stud 51 in the plate 3. The spring 49 normally tends to rotate the pivotal lever 47 in a clockwise direction as shown. The top portion of the lever 47 is provided with an outwardly extending projection or stud 52 adapted to contact one of the pins 43 (shown in circular dotted lines for clarity) provided on the inner face of the rotator plate 30. As is clearly shown in Fig. 1, the front face of the rotator plate is provided with a plurality (preferably three) of studs 53 preferably spaced one hundred twenty degrees apart on the plate 30, but not limited thereto. These pins act as release pins for a purpose as will be hereinafter set forth. In similar manner the pins 43 on the back face of the plate 30 are also spaced one hundred twenty degrees apart, but not limited thereto. Each of the stop pins 43 are preferably disposed on the rear of the plate 30 in about a media angular position between the release pins 53 disposed on the front face of the plate 30. The spacing of the pins 43 and 53 may be variable, but in the present instance assures that a plurality of coins of any diameter will be carried through one complete cycle of revolution. It will be apparent that the variance in the pin spacing may vary between ninety and one hundred eighty degrees depending upon the number of coins utilized which may be varied as desired.

As a coin is inserted and moved through slot 45 by the pressure of the operator's finger, the coin trip lever 47 is pivoted in a counter-clockwise direction to the position of the dotted lines as shown in Fig. 1, thereby moving the flanged portion 52 thereof out of contact with the stop pin 43 on the inner face of the rotator plate 30 in order to permit rotation of the plate 30 in a counter-clockwise direction (Fig. 1) under action of the spring 6. As the rotator plate 30 is propelled counter-clockwise, the pin 43 engages the circumference of the inserted coin which when inserted through the slot 45 will be supported by the pin 43 and brought into engagement with the right hand face 38 (Fig. 1) of the cam 36 so that the coin may be propelled simultaneously in a counter-clockwise direction with the plate 30 and at a constant speed as determined by the speed limiting device 33. Movement of the inserted coin in a counter-clockwise direction will cause contact with a bell crank lever 58 pivotally connected at pin 59 to a coin re-set lever 60 in turn cooperating with an index pawl and ratchet cumulative indexing mechanism as will be hereinafter set forth.

The present automatic parking meter structure is capable of operation on a multiple of coins of variable diameter and variable denominations, and coins of at least four in number, although a greater number may be utilized. Coins of the United States of America have been utilized for exemplification of the various automatic operations of the meter. However, it is to be understood that the various sized coins, as well as various denominations of coins of any country may be utilized when desired. Upon release of the rotator plate 30 by the insertion of a coin, movement of the coin thereby brings it into contact with the bell crank lever 58 to cause a freely pivotal movement thereof with a simultaneous movement of the re-set lever 60. The re-set lever is similar to that disclosed in applicant's co-pending application No. 345,571 and comprises an elongated leg portion 61 formed with a larger cam portion 62 having a plurality of cam recesses 63 and communicating with a smaller extension leg 64 (Figs. 3 and 4). The leg 61 and enlarged portion 62 are disposed on the front side of the front plate 3 and are connected with a cam plate 65 disposed on the rear face of the plate 3 by suitable stud members 66 and 67 extending through an oddly shaped aperture 68 provided in the plate 3 (Fig. 14). The connecting cam plate 65 is fixed with the main shaft 17 through a suitable bearing 70 (Fig. 15).

The re-set lever 60 in normal rest position is substantially at the angular position as shown in Fig. 3. The enlarged cam plate 65 is connected by pin 71 with a leg 72 of a leaf cam 73 operating with the cumulative indexing system as will now be described prior to the operation of the re-set lever 60.

A freely rotatable shaft 74 (Figs. 1, 2 and 15) is disposed in the upper portion of the parking meter unit between the plates 3 and 4. The shaft 74 is loosely mounted in bearings 75 and 76 (Fig. 15) and an idler lever 77 is fixed on the shaft 74. A time indicating disc 78 is loosely mounted on the shaft 74 conterminous and parallel with the lever 77. The segment or disc 78 is provided with an indicator or pointer 79 co-operating with the dial 23 in the usual manner. A substantial portion of the circumferential periphery of the disc 78 is provided with a plurality of gear teeth 80 for a purpose as will be hereinafter set forth. A freely rotatable idler gear 81 is secured to the lever 77 by a stud 82, and the gear 81 is provided with peripheral teeth 83 adapted to mesh with the disc teeth 80. The gear teeth 83 also mesh with teeth of a gear 84 rigidly disposed on the shaft 21 (Fig. 15). The gear 84 is driven through the shaft 21, pinion 22, larger segment 16a of the compound gear 16, and gear 12 in a manner as will be hereinafter referred to. The gear train 22, 16 and 12 are time controlled through the escapement mechanism 19 substantially in the same manner as provided in applicant's co-pending application No. 345,571.

As is clearly shown in Figs. 1, 3 and 4, a stop indexing mechanism is loosely secured to the shaft 74 and disposed substantially adjacent or parallel to one side of the indicator segment 78. The indicating mechanism in addition comprises a bell crank indexing lever 86 pivotally disposed on a stud 87 provided between the front and rear plates 3 and 4. The index lever 86 has an outwardly depending leg 88 in one direction and a second depending leg 89 in substantially the opposite or perpendicular direction. A third leg 90 extends in a different direction from the first two legs 88 and 89. The leg 89 is provided with a stop pawl or detent 91. One end of the stud 87 is disposed in an elongated slot 92 (Fig. 17) for a purpose as will be hereinafter set forth. The leg 90 has one end connected to a helical spring 93 (Fig. 3) through a pin 94, while the opposite end of the spring 93 is connected at 95 to one of the arms 24 supporting the dial. The spring 93 tends to urge the bell crank lever 86 in a counter-clockwise direction. The outer extremity of the leg 88 is provided with an outwardly depending stud, or pin 96 adapted to cooperate with the undulated outer cam edge 63 provided on the enlarged portion 62 of the re-set lever 60. The plate apertured portion 68 (Fig. 14) permits extension of the pin 96 from the front of plate 3 to the rear side thereof with engagement of the cam plate 62 and the undulations 63 of the re-set lever 60. It will be apparent that the re-set lever is disposed on the front face of the plate 3, while the indexing mechanism is disposed to the rear thereof.

From Figs. 2 and 3 it will be apparent that an indexing spider or pronged disc member 100 is provided and has an apertured central web 101 which is loosely mounted on the shaft 74, said spider being parallel and conterminous with the indicator gear segment 78. The spider 100 cooperates with an index ring 102 preferably disposed parallel and in front of the spider, and which ring is provided with a plurality of variable sized teeth on the outer circumference thereof comprising a plurality of small teeth 103, and a pair of larger teeth 104 and 105. The smaller teeth 103 are interposed between the larger teeth respectively. All the teeth are adapted to cooperate with the stop or pawl member 91 in the indexing operation as will be hereinafter set forth. It will be apparent that the number and size of teeth on the ring 102 may vary, and that the teeth may be carried on one or more index rings disposed parallel to each other as desired.

As shown in Figs. 2 and 3, the spider 100 is provided with an extension leg 106 having on the outer extremity thereof a pawl member 107 which is pivotally secured thereto by a stud 108 and urged in a counter-clockwise direction according to Figs. 2 and 3 by a spring 109. The pawl 107 is adapted to engage the teeth 80 of the gear segment 78 for indexing time relative to the size of coin used in a manner as will be hereinafter set forth. The disposition of the index ring 102 (or rings, if desired) adjacent the spider 100 is provided by a plurality of holding flanges or dogs 110 preferably spaced approximately one hundred twenty degrees apart on the spider 100 for assisting in the holding of the index ring 102 adjacent thereto. A clamping screw 111 is adapted to be threaded in an aperture (not shown) into the spider 100 and is provided with an enlarged head portion overlapping the inner periphery of the index ring 102 for maintaining it in supported position relative to the dogs 110. In this manner, the index ring 102 may be slipped around the dogs 110 and then clamped in a fixed position relative to the spider 100 by the stud 111. When it is desired to adjust the index ring 102 relative to the spider 100, it is only necessary to loosen the stud 111 permitting rotative or circular movement between the spider 100 and the ring 102. It will be noted that the spider 100 at a point immediately behind the second large tooth 105 is provided with an upstanding flange or tooth portion 112 acting as a stop member to prevent any over-running of the spider 100 and the index ring 102 in certain coin operations as will be hereinafter set forth. However, the tooth 112 may be also used as a U.S. twenty-five cent or quarter coin indexing tooth by adjustment of the indexing ring 102 as will be hereinafter set forth. The tooth 112 may not be integral with the spider 100, but may be provided on a separate plate and held in fixed position by the screw 111, but capable of adjustment in a manner not shown.

The indexing operation is effected through the spider 100, in index ring 102 and spider extension leg 106 by providing direct engagement of the spider 100 with the teeth 80 of the segment 78 through the pawl 107. The pawl 107 is normally maintained out of engagement with the teeth 80 by the arcuate outer periphery 113 of a leaf cam 114 connecting through its leg 72 and pin 71 with the cam plate 65 of the re-set lever 60. From Figs. 2 and 3 it will be apparent that the body portion 114 of the leaf cam is substantially shaped as a quarter segment of a circle which body is provided with a groove or recess 115 adapted to be slidably disposed around the shaft 74. The leaf cam is moved vertically simultaneously with the movement of the re-set lever 60 through its pivotal connection with the pin 71. With the re-set lever in rest position as shown in Fig. 3, the arcuate periphery 113 of the cam is contacting the inner edge 116 of the pawl 117 and prevent engagement thereof with the teeth 80. However, upon actuation of the reset lever 60 in a counter-clockwise direction in a manner to be hereinafter set forth, the leg 72 is moved downwardly with a simultaneous downward movement of the body portion 114 away from the pawl edge 116 and permit engagement thereof with the teeth in a manner as shown in Fig. 4.

The operation of the modified form of the meter will be explained for four variations of coins of the United States of America, namely the penny, dime, nickel and quarter, but the invention is not limited to such variations in coins and may be utilized with a greater or lesser number of variable coins either in size or denomination, and for any country.

The operation of the meter upon the insertion of a U.S. five cent or nickel is in certain aspects similar to that of prior Patent No. 2,625,250 hereinbefore referred to. However, in addition, the present structure provides for an operation which includes utilization of the meter with or without the time registration for the penny, the ten cent or dime operation and the twenty-five cent or quarter. The present modified structure provides for a distinct improvement over the structure of prior Patent No. 2,625,250 in permitting operation of the meter upon insertion of the dime which could not be accomplished in the aforesaid meter structure, as well as operation with a twenty-five cent or quarter coin. The operation of each of the above coins will now be explained in the following sequence, penny, dime, nickel and quarter.

*Penny operation*

Figures 18, 20:
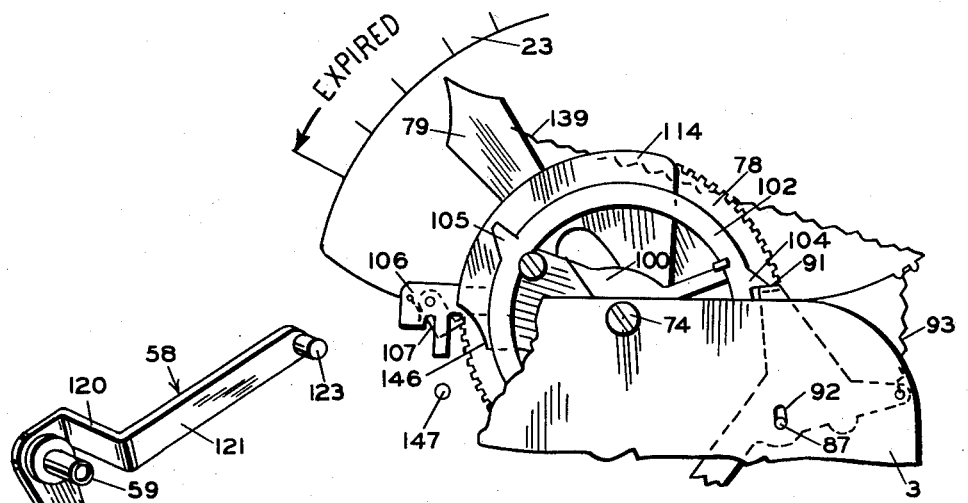
Figure 18 is a similar view showing the operation of the index pawl for the first coin insertion in the memory function.
Figure 20 is a perspective view of the bell crank lever that is adapted to cooperate with the re-set lever.

As is clearly depicted in Figs. 1 to 4, inclusive, and Figs. 14 and 15, upon insertion of a penny coin shown in dotted lines and indicated by reference P, the coin actuator lever 47 is tripped thereby releasing the coin rotator plate 30 for movement in a counter-clockwise direction, whereby the penny coin is moved in the same direction therewith by the supporting pin 43 and along the right edge 38 of the cam 36. During this movement, the small diametrical width of the penny coin precludes any contact with the pivot pin 59 of the bell crank lever 58, which also precludes any pivotal movement of the upper leg 121 of the bell crank lever 58 (Fig. 20). However, continued rotation of the plate 30 moves the penny into contact with an offset leg portion 120 (Figs. 1, 20) connecting the upper leg 121 of the bell crank lever with a lower leg 122. The offset leg portion 120 is disposed in the same plane, but in a position substantially perpendicular or at right angles to the legs 121 and 122. Engagement of the offset leg 120 by the penny P will cause movement of the bell crank unit 58 upwardly thereby causing simultaneous movement of a pin 123 provided at the outer extremity of leg 121.

The pin 123 is normally disposed in oddly shaped aperture 124 provided in the plate 3 above aperture 68 (Fig. 14), and at a point 125. Continued movement of the leg 121 of the bell crank 58 in a slightly arcuate counter-clockwise path will position the pin 123 at the uppermost portion 126 (Fig. 1) of a cam plate 127. The cam plate 127 is pivotally secured to the plate 3 by a stud 128. The plate 127 is adjustably secured to the rear of the plate 3 and is provided with an inclined cam edge 129 normally disposed over a portion of the aperture 124 as clearly shown in Fig. 1 so that the pin 123 will move along the edge 129 upwardly to a point 126 upon movement of the bell crank lever 58. During the movement of the bell crank lever 58, there is a simultaneous movement of the re-set lever 60 in substantially the same direction to effect an operation of the indexing mechanism. However, with the pin 123 disposed at the upper point 126, the penny P has been moved by the rotator plate 30 and its supporting pin 43 out of contact with the offset leg 120, thereby freeing the connected re-set lever 60 for a return movement to rest position such as shown in Fig. 3. The return movement of the re-set lever is provided by a pair of helical springs 130, 131 connected to the pin 66 and disposed on a bias for connection to a pair of pins 132 and 133 provided in the front plate 3 as is clearly shown in Figs. 3 and 4. With release of the re-set lever for return movement to rest position, the rotator plate 30 will continue to move the penny in substantially a counter-clockwise direction until insertion of another coin which will eventually dispose the coin into the coin chute 134 and into a suitable coin container (not shown).

The disposition of the inwardly directed pin 123 (Figs. 1 and 20) in the upper portion 126 of the cam edge 129 and conterminous with the upper edge 136 of the aperture 124 with a simultaneous movement of the re-set lever 60 will permit movement of the pin 96 on the outer extremity of the leg 88 of the index pawl 86 into the first recess 137 (Fig. 4) of the undulations 63. The aforementioned movement of the bell crank unit 58 simultaneous with that of the re-set lever 60 permits a counter-clockwise movement of the index lever 86 and pin 96 along the undulated surface 63 to be brought to rest in the recess 137. The counter-clockwise movement of the lever 86 is under action of the spring 9. It will be apparent that such movement positions the detent 91 into engagement with the first penny tooth 103 (Fig. 4). The penny tooth 103 is caused to engage the detent 91 in the following manner. Upon movement of the re-set lever 60 in a substantially counter-clockwise direction, the idler gear 81 is disengaged from the gear teeth 80 with a simultaneous engagement of the pawl 107 with the teeth 80 by movement of the leaf cam 113 as has been hereinbefore set forth. The idler gear is moved by the idler lever 77 which in turn is moved through actuation of the re-set lever 60 in that the re-set lever engages a pin (not shown) on the idler lever to move it in a slightly counter-clockwise direction and thereby moving the gear 81 away from the teeth 80. In this manner, the indexing mechanism, including the gear segment 78, its engaged spider 100 and index ring 102 are free to rotate in a clockwise direction under action of a helical spring 138 anchored at one end 139 to the indicator 79, and at the opposite end 140 to one of the dial supporting flanges 24, much in the same manner as that set forth in applicant's co-pending application No. 345,571 heretofore mentioned.

After the re-set lever 60 has been actuated to place the stop pawl 91 in the path of the index ring 102 (Fig. 4) and the penny tooth 103, with a simultaneous release of the gear segment from the disc teeth 80, the gear segment through connection with the pawl 107 is caused to rotate clockwise and place the indicator 79 adjacent the desired time registration on the dial 23. The time registration may vary as desired for the penny coin, but in the present instance is shown to be about one-fifth of an hour, or twelve minutes (Fig. 4). Continued rotation of the rotator plate 30 moves the penny out of contact with the offset leg 120 as heretofore set forth providing for a release of the bell crank 58 and the re-set lever 60 so that the re-set lever 60 may be returned under action of the springs 130 and 131. When the re-set lever is moved to rest position as shown, the idler gear 81 is again engaged with the teeth 80, thereby providing direct engagement through gears 82, shaft 21 and gears 22 with the clock mechanism and timer 19.

With return movement of the re-set lever 60, the spider 100 and the index ring 102, along with the arm 106, are moved in a reverse or counter-clockwise direction under action of any suitable spring means (not shown). Furthermore, the rest position of the re-set lever 60 will move the leaf cam body 114 upwardly to cause disengagement of the pawl 107 with the teeth 80. After completion of the penny operation, the rotator plate 30 moves the penny in a continued counter-clockwise direction to be deposited in one of the display windows 44 until a subsequent insertion of coins into the parking meter unit for eventual discharge into the coin chute 134.

In some instances it may be desired to eliminate the penny operation altogether due to its smaller denomination and use only a plurality of larger denomination coins such as where increased time registrations are required. The present structure provides for elimination of the penny operation by movement of the adjustable cam member 127 to a position away from the aperture 124 and out of the path of the pin 123. The movement of the cam plate 127 may be accomplished by loosening the adjusting screw 128. With the cam plate 127 disposed in a position such as shown in Fig. 2, the penny coil will operate in the same manner as that shown in Fig. 1, but the pin 123 on the bell crank lever 58 is caused to move along a right edge portion 141 of the aperture 124 so that the re-set lever 60 will not be moved sufficiently in an arcuate counter-clockwise direction to permit sufficient movement of the index pin 96 from the position as shown in Fig. 3 to the recessed portion 137 as shown in Fig. 4. Consequently, the index lever 86 will not be moved sufficiently to move the detent 91 into the path of a rotating indexing ring 102. In the non-use of the cam 127, a continued rotation of the penny coin beyond the top surface of the cam 36 and away from the offset leg 120 will permit return movement of the reset lever 60 to rest position without actuation of the indexing mechanism. This slight movement of the re-set lever 60 with the cam 127 omitted is not sufficient to disengage the idler gear 81 from the gear segment 78 or position the expired signal 142 in an inactive or down position. The expired signal 142 is shown in active position in Fig. 1 and shown supported by the shaft 74 in Fig. 15. The operation of the expired signal 142 is the same as that depicted and disclosed in applicant's co-pending application No. 345,571 heretofore set forth and it is not seen that any further explanation is necessary in the present application. It will be apparent that the present invention permits a penny coin operation, but also provides for a by-passing of the penny coin through the meter without any functioning of the indexing mechanism for time registration, if desired.

Dime operation

The operation of the meter for a dime or ten cent coin is clearly set forth in Figs. 5, 6, 7 and 8 and is similar to the penny coin operation heretofore described. Upon insertion of a dime coin, referred to by reference character D (Fig. 5), the coin is moved by the plate upon release of lever 47 and brought into engagement with the right side 38 of the cam 36, through support by one of the pins 43 of the released rotator plate 30 so as to be moved in a counter-clockwise direction simultaneous with the rotary plate 30. The dime coin is subsequently brought into engagement with the offset leg portion 120 of the bell crank lever 58, and continued rotation of the plate 30 will simultaneously move the coin D and the leg 121 of the bell crank lever in a counter-clockwise direction simultaneous with movement of the re-set lever 60, so that the pin 123 is moved from position of rest as shown in Figs. 3 and 14 in the aperture 124 to a position as shown on a cam surface 143 as shown in Fig. 6. At this position of the pin 123, the opposite leg 122 of the bell crank lever 58 has been moved to position a projecting lip or pin member 144 carried on the extreme lower end of the leg 122 into contact with one of the pins 53 heretofore mentioned and carried on the outer face of the coin rotator plate 30, thereby providing a direct connection between the rotator plate 30 and the bell crank 58. The projecting lip 144 on the leg 122 was precluded from making connection during the aforesaid penny operation of the meter because the larger diameter of the penny coin as distinguished from the smaller diameter of the dime coin would raise the bell crank lever 58 in a slightly arcuate counter-clockwise direction sufficiently to move the lip or flange 144 above the path of the oncoming pin and thereby precluding any engagement therewith. However, in the dime coin operation, the engagement of the lip 144 with the pin 53 is provided so that the dime coin will maintain engagement with the offset leg 120 and cause movement of the bell crank lever 58 and particularly the leg 121 in order to move the pin 123 from the initial position as shown in Fig. 5 to the position as shown in Fig. 6, after which the dime coin D is permitted to drop into the recess 40 on the cam 36 and away from any engagement with the offset leg portion 120. However, the rotator plate 30 through the lip flange 144 is still engaging the bell crank 58 to continue a counter-clockwise pivotal movement of the bell crank 58 and the pin 123 along the peripheral edge of the cam surface 143. In this manner, the re-set lever 60 is caused to move simultaneously in substantially the same direction permitting movement of the indexing pin 96 through a series of operations along the cam surface or undulations 63, thereby causing the pin 96 to first make a pass at the one cent index tooth 103 (Fig. 7) due to disposition of the pin 96 in the penny recess 137. However, the continued movement of the re-set lever 60 and pin 96 along the undulations 63 will cause the pin 96 to make a subsequent pass at the five cent tooth 104 with a final disposition in the cam recess 145 (Fig. 8) for the dime coin requirement as is clearly shown in Fig. 8. It will thus be apparent that the present unit permits for automatic operation of a dime coin of smaller diameter and larger denomination than that of the penny and nickel, with a complete operation of the indexing mechanism in substantially the same manner as that set forth for the penny coin operation.

*Memory operation*

Figure 17:
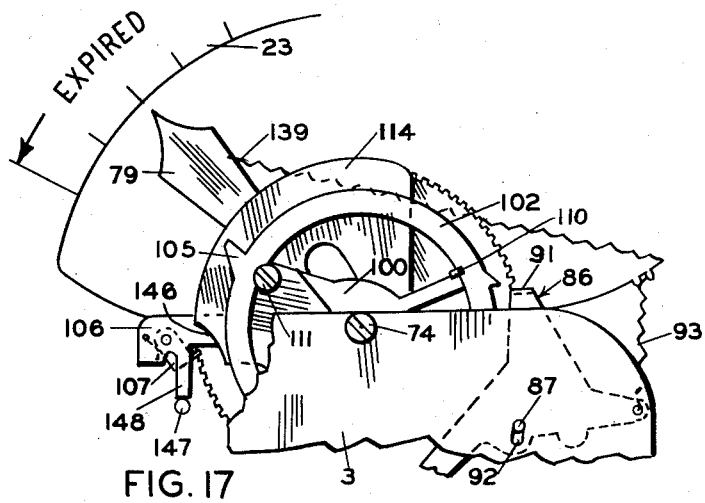
Figure 17 is a view somewhat similar to Fig. 3 with certain parts omitted for clarity and particularly depicting the operation of the meter at the initial stage of the memory function thereof.
Figure 19:
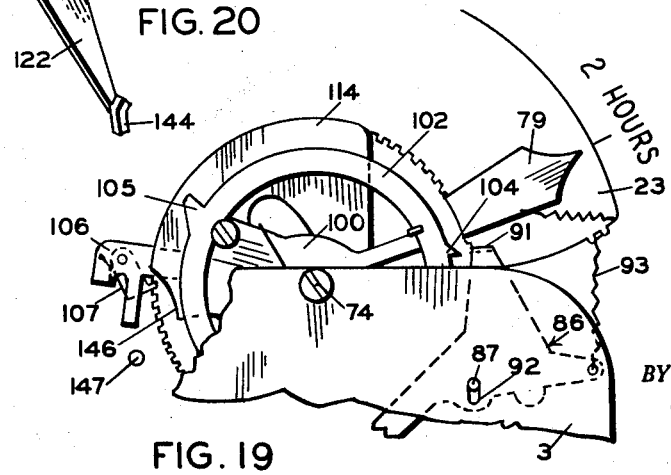
Figure 19 is a view similar to Fig. 18 showing the operation of the index pawl after insertion of the second coin during the memory function.

One of the important features of the present meter construction is to effect a memory operation where it is desired to utilize either a dime coin or two nickel coins for a full dial time registration, regardless of the amount of time registration, whether it be one or two hours, or more as desired. The memory operation is to assure a full registration of time on the dial by the insertion of either a dime or two nickels, and particularly where a coin of lesser value, or the insertion of one nickel cannot provide for a partial time registration on the dial. In the present meter structure, this memory operation is accomplished by a partial elimination of the leaf cam body segment 114 to provide an inclined portion 146 (Figs. 17, 18 and 19). The cut off or inclined portion 146 is disposed substantially adjacent the rest position of the spider leg 106 carrying the pawl 107 (Fig. 17). As shown in Fig. 17, a pin or shaft 147 extends inwardly from the plate 3 and acts as a stop member for a projecting leg 148 of the spide extension leg 106 in order to stop the counter-clockwise movement of the spider member and leg 106 in its return to a rest position. With the leaf cam body 114 having the cut off portion 146, the spider member 100 and its cooperating index ring 102 will act as a non-cumulative meter when coins of lesser value are inserted due to the engagement of the pawl 107 with the teeth 80 of the segment 78 at the point adjacent the inclined or cut off portion 146 thereby permitting only a short time registration on the dial of a minute or two minutes. In such an operation, the index ring 102 has been adjusted to position the first large nickel tooth 104 at a circumferential position closer to that of the detent 91. Consequently, upon insertion of a coin, such as a nickel only, the tooth 104 will engage the detent 91 and permit only a short time registration, particularly such as that shown in Figs. 17 and 18. In Fig. 17 is depicted the memory operation with a small amount of time left on the dial and before insertion of a coin, whereas Fig. 18 shows the operation after insertion of the first coin, such as the nickel, so that the detent 91 has moved over and under the tooth 104 but the short throw of the index ring 102 only provides a minute or two registration on the dial 23. Furthermore, the pivot pin 87 is disposed in the lost motion slot 92 (Figs. 17 and 18) which permits the engaged detent 91 to push down the bell crank 86 slightly, which upon return movement will position the detent 91 away from the previously engaged nickel tooth 104, thereby assuring only the previous registration for a short period of time. Continued rotation of the spider 100 with a subsequent coin insertion, such as a second nickel or dime coin, will bring the coin tooth 105 (Fig. 19) into engagement with the detent 91 with a simultaneous rotation of the indicator segment 78 and indicator 79 to provide the full amount of time registration on the dial 23 (Fig. 19). The second coin may be a dime and accomplish the same result as a nickel. However, a penny could not be inserted as a second coin because in such an operation, the penny cam 127 previously referred to has been removed from the aperture 124 and would not effect any time registration whatsoever.

The provision of the cut-away portion 146 on the leaf cam 114 provides for an initial engagement of the pawl 107 and teeth 80 and precludes the function of the leaf cam 114 to prevent engagement of the pawl and teeth as has been previously set forth for cumulative indexing of time. However, upon insertion of the second nickel or dime coin, the index ring 102 and its engaged spider leg 106 will move simultaneously in a clockwise direction to position the tooth 105 into engagement with the detent 91 thereby providing full registration of time on the dial. After the full time registration, the leg 106 and spider 100 are returned in a counter-clockwise direction to rest position by a suitable spring means (not shown).

*Nickel operation*

Figure 9:
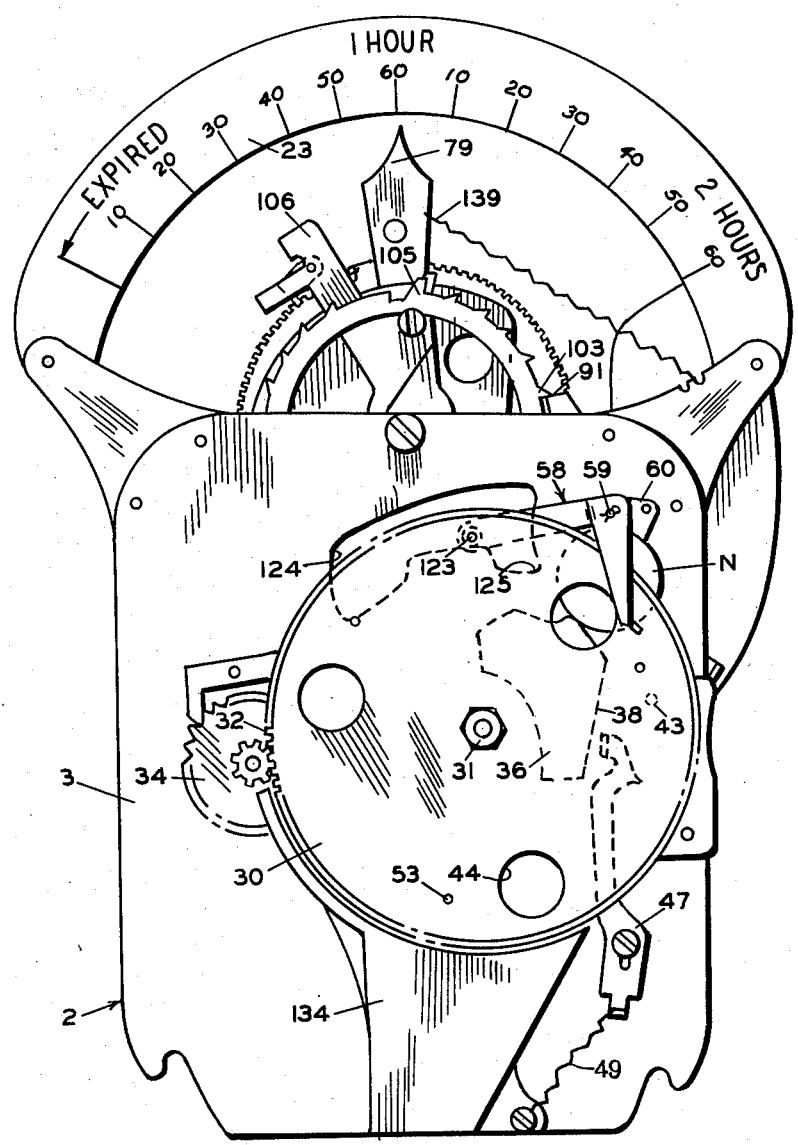
Figure 9 is a view similar to Fig. 1 showing initial position for a United States five cent coin.

The operation of the nickel coin is clearly depicted in Figs. 9, 10 and 12 and is very similar to the penny coin operation in that as the nickel coin, referred to as N, moves the trip lever 47 to cause actuation of the rotator plate 30 one edge of the nickel is moved along the edge 38 of the cam 36 in a counter-clockwise direction to be brought into contact with the pin 59 of the bell crank lever 58, thereby causing a movement of the bell crank in an upward and slightly arcuate counter-clockwise direction. This movement of the bell crank 58 and particularly the arm 121 thereof moves the pin 123 from a rest position at 125 for disposition on the cam surface 143 of the aperture 124 as shown in Fig. 9. The bell crank lever 58 does not have any particular function during the nickel operation except that the pin 59 moves the re-set lever 60 simultaneous therewith in substantially the same direction so that upon movement thereof pin 96 is permitted to move into the undulated surface 63 and come to rest in the cam recess designated 149 (Fig. 12) thereby permitting movement of the detent pawl 91 into contact with the first large tooth 104 on the ring 102 for registering the amount of time for the five cent coin. It will be apparent that the counter-clockwise movement of the re-set lever 60 also disengages the idler gear 81 from the gear 82 in a manner as has been heretofore referred to to permit the rotation of the index ring 102 simultaneously with the gear segment 78 for the cumulative indexing of the apparatus under actuation of the spring 150. The idler gear 81 when disengaged from the gear rotates freely with the clockwise rotation of the disc segment 78 after the indexing operation of the detent 91. A continued rotation of the plate 30 moves the nickel N into the recessed portion 40 and away from the bell crank pin 59, thereby permitting the re-set lever 60 to be returned to rest position such as disclosed in Fig. 1. Continued movement of the plate 30 brings the nickel N into contact with the offset leg portion 120, thereby moving the non-functioning bell crank lever 58 upwardly a slight distance with a slight upward movement of the pin 123 to the upper edge 151 of the aperture 124 (Fig. 10). It is in this latter position that a release of the re-set lever is effected to permit return to its original position thereby re-engaging the idler gear with the gear train for operation with the timer mechanism.

Quarter coin or twenty-five cent operation

Figure 11:
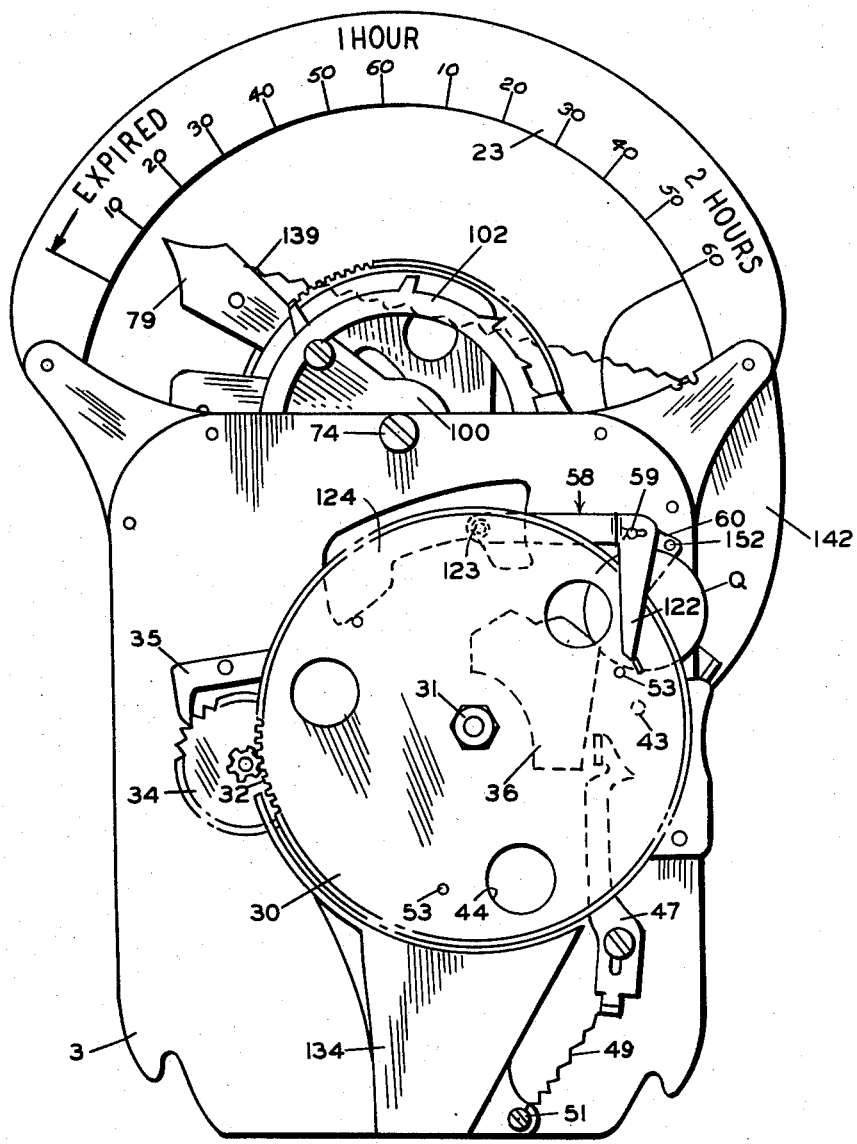
Figure 11 is a view similar to Fig. 1 showing the operation for a United States twenty-five cent coin.

The quarter or twenty-five cent coin operation is clearly depicted in Figs. 11 and 13 and is similar to the five cent coin operation previously described. As the quarter coin, referred to as Q, is initially placed in the meter (Fig. 11), it engages the edge 38 of the coin cam 36 and is moved by the rotator plate 30 into contact with the pin or bearing 59. The quarter coin is of larger diameter and as such permits first engagement with the pin 59 rather than with the offset leg 120 similar to that of the nickel coin operation. The quarter Q also contacts the re-set lever pin 152 (Fig. 11) which acts as a guard to prevent the quarter coin from being dislodged by any abusive jarring of the meter mechanism by the operator during movement of the re-set lever from a rest to indexing position. Movement of the quarter coin upwardly by the rotator plate 30 in contact with the pins 59 and 152 moves the re-set lever 60 in a slightly arcuate counter-clockwise direction in the usual manner with a simultaneous movement of the bell crank lever 58. However, movement of the bell crank 58 is substantially a loafing or non-functioning action and has no particular effect on the operation of the re-set lever 60. The quarter coin Q moves the re-set lever 60 its greatest upward position in a counter-clockwise direction, and consequently permits movement of the pin 96 along the undulated surface 63 for positioning the pin on an inclined surface 153 (Fig. 13) beyond the undulations 63 thereby moving the quarter tooth 112 simultaneous with the indexing ring 102 and spider 100 into engagement with the detent 91. Generally the indexing for a quarter coin is for a full registration on the dial, and as such, the indexing ring 102 is adjusted to move the second nickel coin or dime tooth 105 in a clockwise circular direction away from the quarter tooth 112 thereby assuring that a dime coin or two nickel coins will always register a lesser time than the larger amount of the quarter coin. The larger diameter of the quarter coin maintains engagement and provides for a continued movement with the rotator plate 30 until the coin is disposed on the inclined surface 41 of the cam 36 after which it drops off the coin cam 36 to permit return of the re-set lever to a rest position and re-engagement of the gear train. During engagement of the quarter coin with the pin 59, the bell crank lever 58 moves inwardly with the re-set lever 60 without any appropriate function therefor substantially in the same manner as that of the nickel coin operation.

From the foregoing, it will be apparent that the present invention contemplates a parking meter mechanism which is fully automatic in its operation and is capable for variable selective increments of time depending upon coins of variable size and denomination. In the present instance the machine has shown to be operated with coins of four different sizes and denominations, but it is not limited to any specific number of coins or sizes of coins. The indexing mechanism may be so constructed and arranged to provide for any number and different sizes of coins as is practical. The pre-set operation of the mechanism is such to insure that there is a positive and accurate selection of the time increment prior to any actuation of the indexing mechanism. In addition, the indexing mechanism may be infinitely adjustable to provide for any desired length of parking time on almost any combination of multiple coins of the same size or different sizes, and the coins are all inserted in the same coin slot for operation of the meter.

The operation of the meter on a plurality of variable sized coins may be accomplished without any sequential relationship between the length of parking time given for any one coin of the series, or the value of the coin of the series, or the physical size of the coin of the series, and the meter may be adjusted for any desirable length of parking time in complement either to the size or denomination of the coin.

Furthermore, the operation of the meter is such to provide for a time registration through a plurality of coins of variable size and denomination and particularly to provide for a full registration of a coin of a smaller diameter but of a greater denomination than of some of the other coins utilized with the meter. In the latter instance, the meter solves the problem of giving full time for a dime coin, although it is smaller in size but greater in value than pennies and nickels now utilized with multi-coin parking meters. In addition, the present construction provides for an automatic parking meter mechanism which embodies a memory function by permitting operation of one coin, such as a first nickel without any substantial time registration, followed by a full registration with the insertion of a second nickel or dime coin. The meter structure contemplates selective time registration for a plurality of coins where one of the coins may be a one cent coin to provide for smaller registrations or the structure is adjustable to permit elimination of the one cent coin registration by completely by-passing the one cent coin through the meter without any time registration therefor. The present meter structure also provides for the facility of conversion for a variable combination of multiple coins of various denominations and sizes.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In an automatic parking meter for receiving multiple coins of varying diameter and different denominations and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator disc at a selected position relative to the time scale, bell crank means pivotally connected with the re-set lever and responsive to the inserted coin movable by the coin rotator for causing movement of the re-set lever to a position relative to the value of the coin, and means on the bell crank cooperating with means on the coin rotator upon utilization of a coin of smaller diameter but of greater denomination than at least two of the coins of the multiple coins utilized for continuing the movement of the re-set lever after the bell crank is non-responsive to the coin, said detent means responsive to the position of the re-set lever for controlling the selected position of the indicator disc.

2. In an automatic parking meter for receiving multiple coins of varying diameter and different denominations and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator disc, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator disc at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator plate providing a latch connection between the re-set lever and the coin rotator after disengagement of the coin and bell crank to permit continued movement of the re-set lever with the coin rotator plate to a position corresponding with the greater denomination of the coin of smaller diameter, said detent means responsive to the position of the re-set lever for controlling the selected position of the indicator disc, and means cooperating with the bell crank lever permitting the selected positioning of the indicator by the use of coins of more than two variable sizes and denominations.

3. In an automatic parking meter for receiving multiple coins of varying diameter and different denominations and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator disc, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator disc at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator upon utilization of a coin of smaller diameter but of greater denomination than at least two of the coins of the multiple coins utilized for continuing the movement of the re-set lever after the bell crank is non-responsive to the coin, said detent means responsive to the position of the re-set lever for controlling the selected position of the indicator disc, means cooperating with the bell crank lever permitting the selected positioning of the time indicator for use with coins of more than two variable sizes and denominations, and single coin slot means for accepting more than two coins of variable size and denomination therethrough for cooperation with the coin rotator.

4. In an automatic parking meter for receiving multiple coins of varying diameter and different denominations and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator disc, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator disc at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator plate providing a latch connection between the re-set lever and the coin rotator after disengagement of the coin and bell crank to permit continued movement of the re-set lever with the coin rotator plate to a position corresponding with the greater denomination of the coin of smaller diameter, said detent means responsive to the position of the re-set lever for controlling the selected position of the indicator disc, and an adjustable cam plate cooperating with the bell crank lever in one position to permit time registration for a coin of small denomination and in another position to preclude any time registration by said coin of smaller denomination.

5. In an automatic parking meter for receiving multiple coins of varying diameter and different denomination and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator disc, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator disc at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator plate upon utilization of a coin of smaller diameter but of greater denomination than at least two of the variable sized coins utilized providing a latch connection between the re-set lever and the coin rotator after disengagement of the coin and bell crank to permit continued movement of the re-set lever with the coin rotator plate to a position corresponding with the greater denomination of the coin of smaller diameter, said detent means responsive to the position of the re-set lever for controlling the selected position of the indicator disc, and means cooperating with the bell crank lever permitting the selected positioning of the time indicator for use with coins of more than two variable sizes and denominations, said bell crank lever having an offset leg portion providing for utilization of one coin of the plurality of variable size coins having a smaller diameter but of a greater denomination than at least two of the variable size coins utilized.

6. In an automatic parking meter for receiving multiple coins of varying diameter and different denomination and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator disc, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator at a selected position relative to the time scale, bell crank lever means pivotally connected with the re-set lever and responsive to the inserted coin movable by the coin rotator plate for positioning the re-set lever in a plurality of variable positions dependent upon the size of the coin, said detent means responsive to the position of the re-set lever for controlling the selected position of the indicator disc, means cooperating with the bell crank lever permitting the selected positioning of the time indicator for use with coins of more than two variable sizes and denominations, said bell crank lever having an offset leg portion providing for utilization of one coin of the plurality of variable size coins having a smaller diameter but of a greater denomination than at least two of the variable size coins utilized, and flange means on said bell crank lever cooperating with means on the rotator plate for continuing movement of the re-set lever after the coin of smaller diameter disengages from the offset leg portion to permit movement of the re-set lever for actuation of the detent means to a position corresponding to the value of the coin.

7. In an automatic parking meter for receiving a plurality of coins of different size and different denomination for indicating a full period of time and where the smaller sized coin is of a larger denomination, and comprising an indicator alternately movable in opposite directions relative to a time scale, a clock works for driving the indicator in one direction relative to the scale, spring means for moving the indicator in a direction opposite to the first mentioned direction, an indexing mechanism for determining the selected period of time having alternate engagement and disengagement with the indicator, a coin rotator plate, trip means to permit rotation of the rotator plate upon insertion of a coin, means for carrying the coin with the rotator plate, a re-set lever movable into a plurality of angular positions, detent means cooperating between the re-set lever and the indexing mechanism for setting the indicator at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator plate providing a latch connection between the re-set lever and the coin rotator after disengagement of the coin and bell crank to permit continued movement of the re-set lever with the coin rotator plate to a position corresponding with the greater denomination of the coin of smaller diameter, said detent means responsive to the position of the re-set lever for controlling the selected position of the indicator, and means cooperating with the indexing means for releasing the indicator for movement relative to the time scale by either insertion of both coins of the larger diameter and lesser value or a single coin of smaller diameter and larger denomination.

8. In an automatic parking meter for receiving a plurality of coins of different size and different denomination for indicating a full period of time and where the smaller sized coin is of a larger denomination, and comprising an indicator alternately movable in opposite directions relative to a time scale, a clock works for driving the indicator in one direction relative to the scale, spring means for moving the indicator in a direction opposite to the first mentioned direction, an indexing mechanism for determining the selected period of time having alternate engagement and disengagement with the indicator, a coin rotator plate, trip means to permit rotation of the rotator plate upon insertion of a coin, means for carrying the coin with the rotator plate, a re-set lever movable into a plurality of angular positions, detent means cooperating between the re-set lever and the indexing mechanism for setting the indicator at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator plate providing a latch connection between the re-set lever and the coin rotator after disengagement of the coin and bell crank to permit continued movement of the re-set lever with the coin rotator plate to a position corresponding with the greater denomination of the coin of smaller diameter, said detent means responsive to the position of the re-set lever for controlling the selected position of the indicator, means cooperating with the indexing means for releasing the indicator for movement relative to the time scale by either insertion of both coins of the larger diameter and lesser value or a single coin of smaller diameter and larger denomination, and a lost motion slot means supporting the detent means to permit movement of the detent means away from the indexing means after one operation thereof.

9. In an automatic parking meter for receiving multiple coins of varying diameter and different denomination and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator disc, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator disc at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator plate providing a latch connection between the re-set lever and the coin rotator after disengagement of the coin and bell crank to permit continued movement of the re-set lever with the coin rotator plate to a position corresponding with the greater denomination of the coin of smaller diameter, said detent means responsive to the position of the re-set lever for controlling the selected position of the indicator disc, an outwardly depending pin provided on the bell crank lever and disposed in an irregular shaped aperture provided in the meter for selecting the position of the bell crank lever with simultaneous positioning of the re-set lever, a stud pin provided on the detent means, a plurality of undulated surfaces provided on the re-set lever responsive to the position of the re-set lever as determined by the position of the bell crank pin to permit movement of the stud pin into one of the plurality of undulated surfaces for selective positioning of the detent relative to the indexing mechanism.

10. In an automatic parking meter for receiving multiple coins of varying diameter and different denomination and comprising an indicator disc movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator disc, a coin rotator plate, means responsive to insertion of a coin for tripping the rotator to permit rotation thereof, means for carrying the coin with the rotator, a re-set lever movable into a plurality of angular positions, detent means cooperating between the re-set lever and the indexing mechanism for setting the indicator disc at a selected position relative to the time scale, bell crank lever means pivotally connected with the re-set lever and responsive to the inserted coin movable by the coin rotator plate for positioning the re-set lever in a plurality of variable positions dependent upon the size of the coin, and means on the bell crank cooperating with means on the coin rotator plate providing a latch connection between the re-set lever and the coin rotator after disengagement of the coin and bell crank to permit continued movement of the re-set lever with the coin rotator plate to a position corresponding with the greater denomination of the coin of smaller diameter, said detent means responsive to the position of the re-set lever for controlling the selected position for the indicator disc, an outwardly depending pin provided on the bell crank lever and disposed in an irregular shaped aperture provided in the meter for selecting the position of the bell crank lever with simultaneous positioning of the re-set lever, a stud pin provided on the detent means, a plurality of undulated surfaces provided on the re-set lever and responsive to the position of the re-set lever as determined by the position of the bell crank pin to permit movement of the stud pin into one of the plurality of undulated surfaces for selective positioning of the detent relative to the indexing mechanism, and single coin slot means for receiving coins therethrough of more than two variable sizes and denominations.

References Cited in the file of this patent

UNITED STATES PATENTS

| | | |
|---|---|---|
| 2,532,906 | Hale | Dec. 5, 1950 |
| 2,625,250 | Hale | Jan. 13, 1953 |